May 29, 1951 J. W. LEIGHTON 2,554,784
WHEEL SUSPENSION AND ANTISWAY CONTROL
Filed May 17, 1946 2 Sheets-Sheet 1
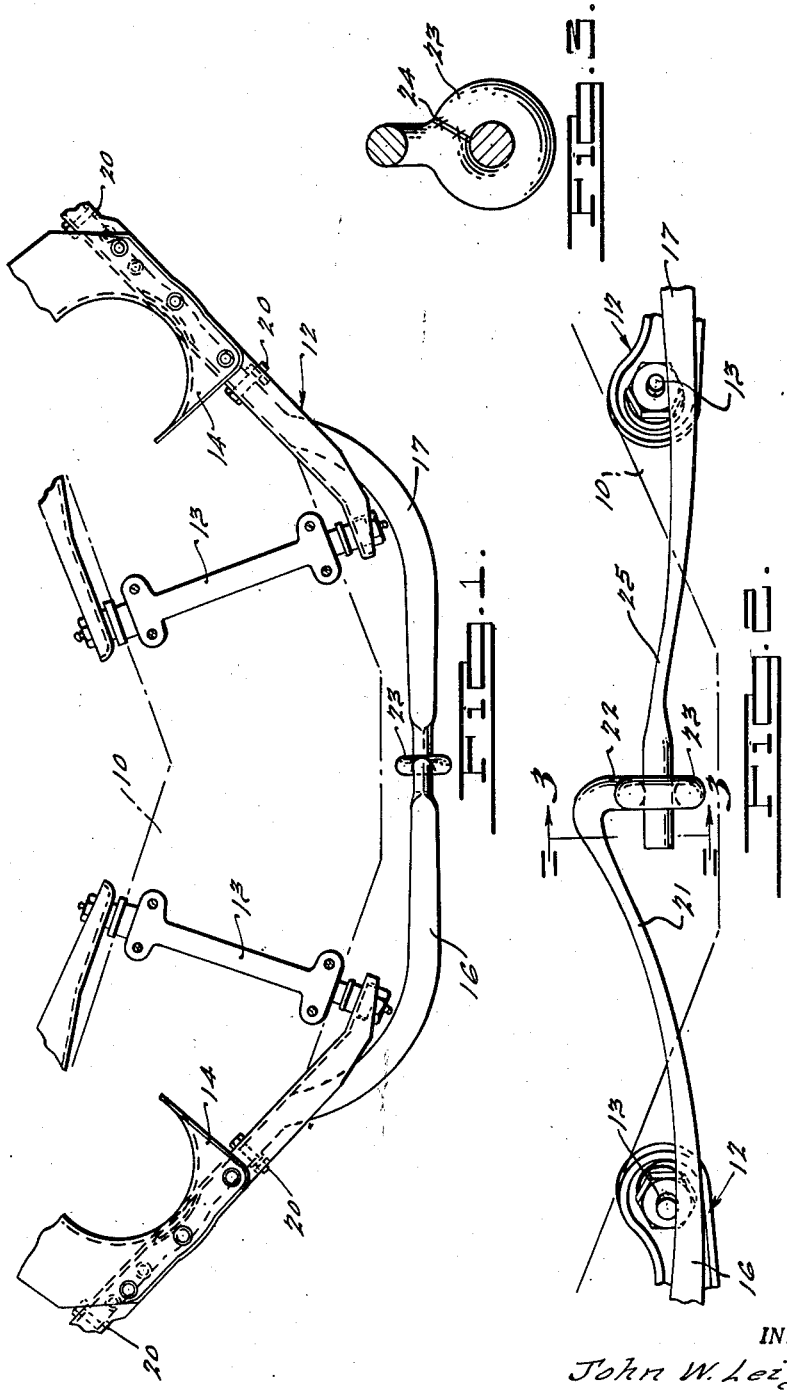
INVENTOR.
John W. Leighton,
BY
Harness, Dickey & Pierce.
ATTORNEYS.

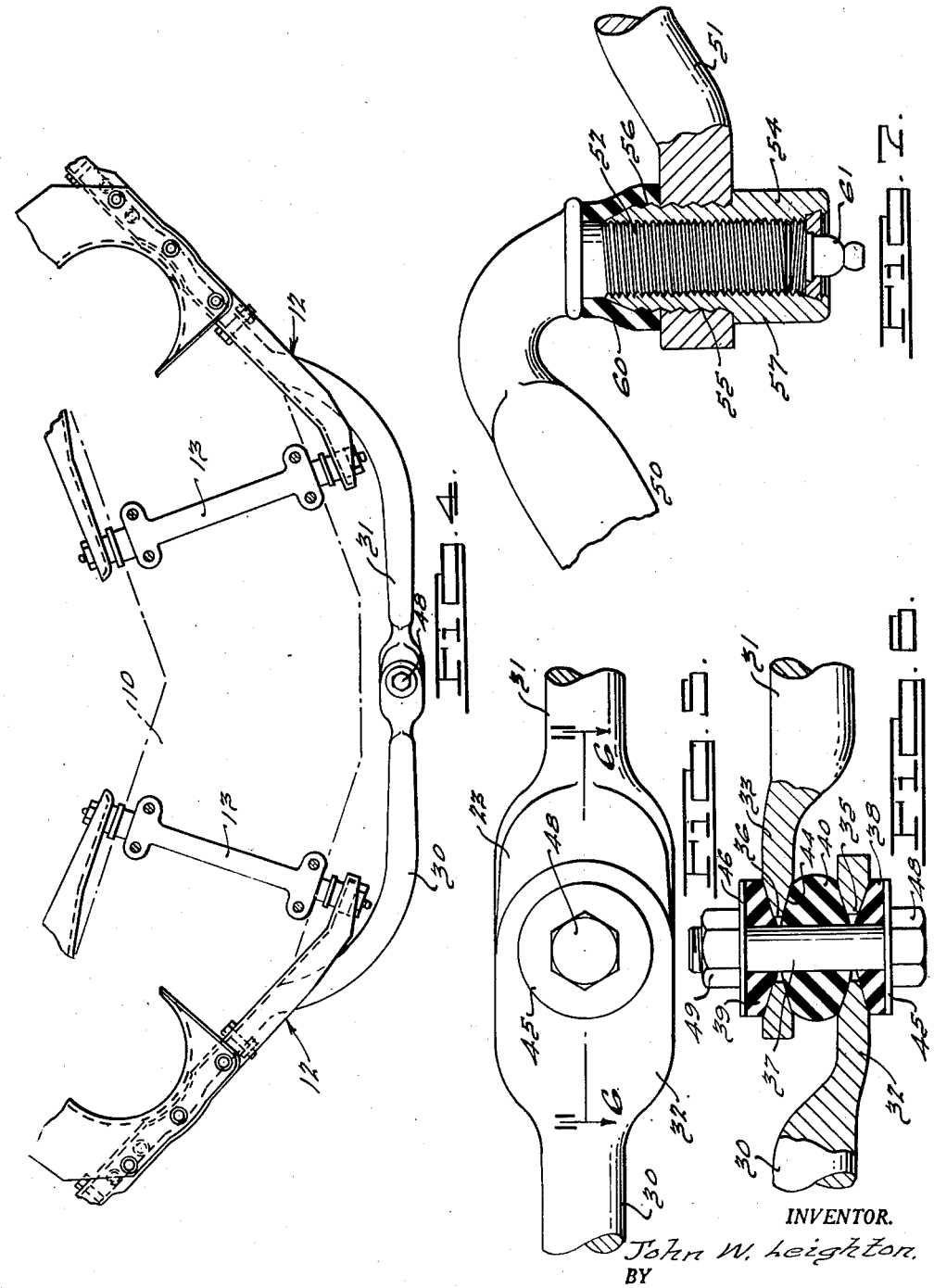

Patented May 29, 1951

2,554,784

UNITED STATES PATENT OFFICE 2,554,784

WHEEL SUSPENSION AND ANTISWAY CONTROL

John W. Leighton, Port Huron, Mich.

Application May 17, 1946, Serial No. 670,579

5 Claims. (Cl. 267—11)

The invention relates to automobiles and it has particular relation to sway or roll controlling devices adapted to restrain rolling or swaying of the vehicle body.

In certain respects the invention constitutes an improvement over those embodied in my copending application for patent, Serial No. 566,869, filed December 6, 1944; Serial No. 598,122, filed June 7, 1945, now Patent No. 2,523,473, September 26, 1950; Serial No. 607,765, filed July 30, 1945, now Patent No. 2,497,459, February 14, 1950 and Serial No. 656,310, filed March 22, 1946.

As stated generally in the aforesaid applications for patent, excellent riding qualities were obtained in connection with individual wheel suspensions as used at first under ordinary road conditions because the coil springs were designed to obtain such qualities. Later, when anti-sway devices were added, such as transverse torsion bars, a varying spring rate was added to the suspensions and the ride became less comfortable. More particularly, in connection with the torsion type of anti-sway bar, the wheels operate independently of each other almost continuously when the car is in motion on the road except where a road is absolutely smooth. In other words, the wheels are moving vertically almost constantly in opposite vertical directions or relatively and, as a a result, the torsion bar consequently is acting as a spring which increases the spring rate of the vehicle. If the bar should be strong enough or has spring resistance sufficient to prevent lateral roll or sway then since such strong spring resistance is added to the car springs, the ride becomes too harsh. On the other hand, if the car springs are made soft enough to obtain a smooth ride with a strong torsion bar, then in those instances when the wheels do move vertically together in the same direction, the coil springs alone support the car and the springing is too soft.

In using an anti-sway bar according to the inventions embodied in the aforesaid copending applications for patent, a similar condition is present as in the case of torsion bars, except that a bar constructed according to such inventions adds less spring resistance to the car springing at all times when the wheels move vertically in a relative sense. Moreover, this added spring resistance characterizing such inventions is substantially present when both wheels move vertically in the same direction. Under the usual road conditions therefore, the ride is softer and even where both wheels move together, the bar adds some resistance to the coil springs so that the latter do not operate alone. On the other hand, if rolling or swaying of the frame tends to occur, the resistance of bars embodied in such inventions becomes magnified greatly due to reverse bending in opposite direction. It follows that the use of the inventions enables obtaining softer rides while still providing strong resistance to swaying of the frame.

The present invention provides an anti-sway bar means generally having similar characteristics as compared to characteristics of the bars embodied in the aforesaid copending applications for patent but is distinguished therefrom by constructing the bar in two parts and connecting them at the center of the vehicle in a pivotal or similar manner. In using anti-sway bar means of this characteristic, over-all bending of both bar sections occurs as either or both wheels move vertically and the pivotal connection facilitates and modifies the action. During normal operation of the vehicle, the bar sections constantly act to increase the spring rate of the vehicle but not undesirably so that a soft ride may be obtained through action of the designed coil springs. On the other hand, when sway or roll tends to occur, great resistance to such action is obtainable for the reason that the two bar sections will still have to bend in opposite directions in the manner that has been described in the copending applications for patent.

One object of the present invention is to provide an improved type of anti-sway bar means connected to the arms of the individual suspensions independently of the frame wherein the anti-sway bar means can be constructed in two sections and then connected together.

Another object of the invention is to provide an improved anti-sway bar means such as indicated above wherein the two bar sections are movably connected at the center of the vehicle so as to lessen the spring resistance added to the coil springs during normal operation of the vehicle.

Other objects of the invention will become apparent from the following specification, from the drawings relating thereto, and from the claims hereinafter set forth.

For a better understanding of the invention reference may be had to the drawings wherein:

Figure 1 is a fragmentary plan view of individual wheel suspensions at opposite sides of a vehicle frame wherein anti-sway bar means constructed according to one form of the invention are embodied, Figure 2 is a fragmentary view on a larger scale and in elevation, showing the anti-sway bar means found in Figure 1.

Figure 3 is a cross-sectional view taken substantially along the line 3—3 of Figure 2.

Figure 4 is a view similar to Figure 1 but showing another form of the invention.

Figure 5 is a fragmentary front elevational view of the joint between the two bar sections in Figure 4.

Figure 6 is a cross-sectional view taken substantially along the line 6—6 of Figure 5.

Figure 7 is a cross-sectional view on the order of Figure 6 illustrating another form of the invention.

Referring to Figure 1, the frame of the vehicle is indicated at 10 and such frame may be of an ordinary type having side members extending longitudinally of the vehicle and having rear and front cross members. That portion of the frame shown in broken lines in Figure 1 may be considered generally as the front cross frame member.

Each of the individual wheel suspensions may be on the order of those shown in the copending applications for patent and comprises an upper pivotal arm not shown, a vertically disposed wheel supporting member hinged to the outer end of the upper arm, and a lower arm 12 hinged to the frame by means of a control bar 13 fastened to the latter. Each of the lower arms 12 at opposide sides of the frame is generally wishbone in shape and includes a pan 14 for supporting the coil spring and it should be understood that the two coil springs support the frame. Attention is also directed to the fact that the front part of the lower arm is channel shaped in cross-section.

The anti-sway bar means shown in Figures 1, 2 and 3 comprises bar sections 16 and 17 extending transversely of the frame and each of the bar sections has its laterally outer end disposed in the front channel of the lower arm. Such end portion of the bar section disposed in the channel is flattened vertically substantially to fit the channel, as has been brought out in detail in certain of the copending applications for patent and the flattened end portion is connected to the vertical web or base of the channel by bolts 20. The bar section 16, as best shown by Figure 2, is heavier and more resistant to bending next to the arm 12 and then progressively towards the center of the vehicle the bar is thinner in a vertical plane so that its resistance to bending decreases towards the center of the vehicle. At its inner end the bar bends upwardly as indicated at 21 and then downwardly as indicated at 22 and the downwardly extending portion is bent into circular form to provide an eye 23. This eye portion is left in round bar stock form and may be integrally closed as by welding indicated at 24. The bar section 17 is generally like the bar 16 except that its inner end, which is left in round bar stock form, extends through the eye 23.

If, as seen in Figure 2, the right arm 12 pivots upwardly about the pivot 13, the bar section 25 will tend to swing about the pivot 13 also and while some pivotal and sliding action may occur between the eye and the end of the bar section 25, bending of both bar sections will occur as may be required. The same action takes place if the left arm 12 swings about its pivot 13. In the event both arms swing together in the same vertical direction, the two bar sections tend to pivot at the center to the extent permitted by the joint, but if the joint reaches the limit of its pivotal movement, bending action occurs thereafter. In the event the frame tends to roll or sway, in which case for example the left hand pivot 13 may move downwardly and the right hand pivot 13 move upwardly, the bar section 16 would tend to bend intermediate its ends in one direction, whereas the bar section 17 would tend to bend intermediate with its ends in a reverse direction. Due to the two bar sections being required to bend in opposite directions great resistance to roll or sway is obtained.

The construction shown in Figure 4 is similar to that already discussed, but in this case two bar sections 30 and 31 are provided which are flattened at their centers as indicated at 32 and 33 to provide wider fragmentary adjacent portions disposed in a laterally overlapping relation. The flat portion 32 is apertured as indicated at 35 and similarly the portion 33 is apertured as indicated at 36 and such apertures receive a bolt 37 which is smaller so as to allow relative movement between the ends. Rubber biscuits 38 and 39 are provided on the bolt at the outer sides of the portions 32 and 33 and a larger rubber biscuit 40 is provided on the bolt between the flattened portions. It may be noted that the flat portions are slightly recessed, such as indicated at 44, so as to receive the biscuits. The bolt is also provided with washers 45 and 46 disposed at the outer sides of the biscuits 38 and 39 and has a head 48 engaging one washer and a nut 49 engaging the other washer. This type of construction will operate substantially in the same way as that shown in Figure 1 in that some modification of the action will take place due to the presence of the rubber connecting elements and relative movement permitted.

In the construction shown in Figure 7, the anti-sway bar means includes two bar sections 50 and 51 fastened to the arms 12 as previously described and which also decrease in vertical thickness towards their inner ends as already described and such sections are pivotally connected at the center of the vehicle by threaded bearing means. This threaded bearing comprises an integral horizontal trunnion 52 on the bar section 50 which is threaded into a bushing 54 disposed in an aperture 55 in the inner end of bar section 51. In order to lock bushing 54 in aperture 55, such bushing has oblique, external threads 56 engaging the aperture and the bushing has a head or shoulder 57 engaging the outer side of the bar. By tightening the bushing in the opening, it becomes locked in place so that pivotal action occurs only on the threaded engagement between the trunnion and internal threads of the bushing. A rubber seal 60 may be employed at the inner end of the bushing to prevent the escape of lubricant and the other end of the bushing may have a grease fitting 61 so that the bearing may be lubricated. In general, this anti-sway bar means will function similarly to those already described excepting that the connected ends can not slide or move relatively in the manner permitted by the eye connection 23 in Figure 2 or by the larger apertures 35 and 36 in Figure 6.

Although more than one form of the invention has been illustrated and described in detail, it will be apparent to those skilled in the art that various modifications may be made without departing from the scope of the claims.

What is claimed is:

1. In combination with a vehicle frame and an individual wheel suspension at each side of the frame, said suspensions including arms pivoted to the frame at their inner ends and extending outwardly away from one another laterally of the frame for swinging movement about substantially horizontal axes extending longitudinally of the frame, a resilient bar element rigidly secured to each arm at a plurality of positions all of which are in the region between its pivot and its outer end and extending laterally of the frame to a point between the two pivots for the arms, and pivotal means connecting the inner ends of the two bar elements, the secured portions of the bar elements and said pivotal means lying substantially in coplanar relation with respect to said arms and said axes in an intermediate position through which said arms are swingable.

2. In combination with a vehicle frame and an individual wheel suspension at each side of the frame, said suspension including arms pivoted to the frame at their inner ends and extending outwardly away from one another laterally of the frame for swinging movement about a substantially horizontal axis extending longitudinally of the frame, a resilient bar element rigidly connected to each arm in the region between its pivot and its outer end and extending laterally of the frame to a point between the two pivots for the arms, and means movably connecting the inner ends of the two bar elements and comprising an eye on the inner end of one bar and having an opening therein extending laterally of the frame and a projection on the other bar extending through the eye and movable relatively thereto in such lateral direction.

3. Ride stabilizing means adapted to be incorporated in a vehicle construction having a frame, supported by individual wheel suspensions at each side of the frame and wherein each such suspension includes an arm extending laterally of the frame and pivoted to the frame at its inner end for swinging movement about substantially horizontal axes extending longitudinally of the frame, said stabilizing means comprising a pair of resilient bar elements, means for rigidly connecting one of the bar elements to each arm in the region between its pivot and its outer end with the bar elements extending laterally of the frame to a point between the two pivots for the arms, and pivotal means connecting the inner ends of the two bar elements and comprising a single threaded bearing.

4. Ride stabilizing means adapted to be incorporated in a vehicle construction having a frame, supported by individual wheel suspensions at each side of the frame and wherein each such suspension includes an arm extending laterally of the frame and pivoted to the frame at its inner end for swinging movement about substantially horizontal axes extending longitudinally of the frame, said stabilizing means comprising a pair of resilient bar elements, means for rigidly connecting one of the bar elements to each arm in the region between its pivot and its outer end with the bar elements extending laterally of the frame to a point between the two pivots for the arms, and pivotal means connecting the inner ends of the two bar elements and comprising a portion having a threaded opening rigidly carried by the inner end of one bar and a threaded trunnion rigidly carried by the other bar and threaded into the opening.

5. In combination with a vehicle frame and an individual wheel suspension at each side of the frame and each including an arm extending laterally of the frame and pivoted at its inner end to the frame for swinging movement about substantially horizontal axes extending longitudinally of the frame, a resilient bar element rigidly secured to each arm at a plurality of positions all of which are in the region between the pivot for the arm and the outer end of the arm, and means movably connecting the inner ends of the bar elements, said bar elements being free from any controlling connection with the frame, and being so arranged relative to the arm pivots that they are free to move upwardly and downwardly past the axes of said pivots as the arms swing on the latter, the secured portions of the bar elements and said pivotal means lying substantially in coplanar relation with respect to said arms and said axes in an intermediate position through which said arms are swingable.

JOHN W. LEIGHTON.

REFERENCES CITED

The following references are of record in the file of this patent:

UNITED STATES PATENTS

| Number | Name | Date |
|---|---|---|
| 327,518 | Buchholtz | Oct. 6, 1885 |
| 848,864 | Stewart | Apr. 2, 1907 |
| 2,112,981 | Best | Apr. 5, 1938 |
| 2,190,298 | Slack | Feb. 13, 1940 |
| 2,225,966 | Beemer | Dec. 24, 1940 |
| 2,442,282 | Utz | May 28, 1948 |
| 2,471,135 | Wyeth | May 24, 1949 |